US00RE34256E

United States Patent [19]

Strand et al.

[11] E Patent Number: Re. 34,256

[45] Reissued Date of Patent: May 18, 1993

[54] TOOL FOR METAL CUTTING

[75] Inventors: Bengt N. G. Strand; Sven L. Eklund, both of Fagersta, Sweden

[73] Assignee: Seco Tools AB, Fagersta, Sweden

[21] Appl. No.: 760,991

[22] Filed: Sep. 17, 1991

Related U.S. Patent Documents

Reissue of:

[64] Patent No.: 4,958,965
Issued: Sep. 25, 1990
Appl. No.: 365,903
Filed: Jun. 15, 1989

U.S. Applications:

[62] Division of Ser. No. 204,284, Jun. 9, 1988, Pat. No. 4,850,759.

[30] Foreign Application Priority Data

Jul. 8, 1987 [SE] Sweden ..... 87027990

[51] Int. Cl.[5] ..... B23B 31/10

[52] U.S. Cl. ..... 408/239 A; 279/8; 279/89; 279/99; 403/258; 408/226

[58] Field of Search ..... 408/226, 239 R, 239 A, 408/240, 238; 279/89, 90, 91, 93, 94, 8, 99; 407/53; 409/234, 232; 403/258, 259, 260

[56] References Cited

U.S. PATENT DOCUMENTS

| | | | |
|---|---|---|---|
| 829,633 | 8/1906 | Decker | 279/99 |
| 1,480,355 | 1/1924 | Webster . | |
| 2,039,855 | 5/1936 | Stone | 279/89 |
| 2,109,108 | 2/1938 | Fesler | 279/8 |
| 2,349,741 | 5/1944 | McLaughlin | 279/89 |
| 3,384,386 | 5/1968 | Ward et al. | 279/89 |
| 3,534,640 | 10/1970 | Macy | 408/226 |
| 3,759,536 | 9/1973 | Bronzini | 279/89 |
| 4,850,759 | 7/1989 | Strand et al. | 408/239 A |

FOREIGN PATENT DOCUMENTS

| | | | |
|---|---|---|---|
| 45310 | 5/1910 | Austria | 279/89 |
| 3314591 | 10/1984 | Fed. Rep. of Germany | 279/8 |
| 1589460 | 5/1970 | France . | |
| 2602162 | 2/1988 | France . | |
| 781423 | 11/1980 | U.S.S.R. | 408/240 |
| 542796 | 1/1941 | United Kingdom | 408/226 |
| 990353 | 4/1965 | United Kingdom | 279/89 |
| 2158374 | 11/1985 | United Kingdom | 279/1 A |

*Primary Examiner*—Daniel W. Howell
*Attorney, Agent, or Firm*—Burns, Doane, Swecker & Mathis

[57] ABSTRACT

A cutter adapted to be rotated about a front-to-rear extending longitudinal axis comprises a front portion having a cutting edge, and a rear portion for mounting a cutter. The rear portion has a conical outer periphery, the shortest radius of which is defined by a rearmost end of the rear portion. The rear portion includes a hook-shaped projection formed by a laterally open recess in the outer periphery.

10 Claims, 2 Drawing Sheets

TOOL FOR METAL CUTTING

Matter enclosed in heavy brackets [ ] appears in the original patent but forms no part of this reissue specification; matter printed in italics indicates the additions made by reissue.

This application is a division of application Ser. No. 204,284, filed Jun. 9, 1988, now U.S. Pat. No. 4,850,759.

BACKGROUND OF THE INVENTION

This invention relates to a tool for metal cutting, said tool comprising a cutting body and a shaft that supports the cutting element.

It is previously known to use exchangeable cutting edges in the shape of indexable inserts for different types of tools for metal cutting. However, this technique in practice has its limitations due to strength reasons when dealing with milling and drilling tools having a cutting diameter of less than or equal to about 10 mm.

The aim of the present invention is to disclose a solution to the problem of how to design milling, drilling and turning tools of small dimensions having exchangeable cutting edges.

The aim of the invention is realized by a tool of the type mentioned above that has been given the characteristics of the appending claims.

THE DRAWINGS

Below embodiments of the invention will be described with reference to the accompanying drawings, where FIG. 1 discloses the elements of a tool according to the invention before they are mounted together; FIG. 2 discloses a tool according to the invention in mounted position; FIG. 3 discloses in greater detail a side view of a cutting body according to the invention; FIG. 4 discloses an alternative embodiment of a tool according to the invention; FIG. 5 discloses a further alternative embodiment of a tool according to the invention; and FIG. 6 discloses still a further alternative embodiment of a tool according to the invention.

DESCRIPTION OF PREFERRED EMBODIMENTS OF THE INVENTION

Figure 1:
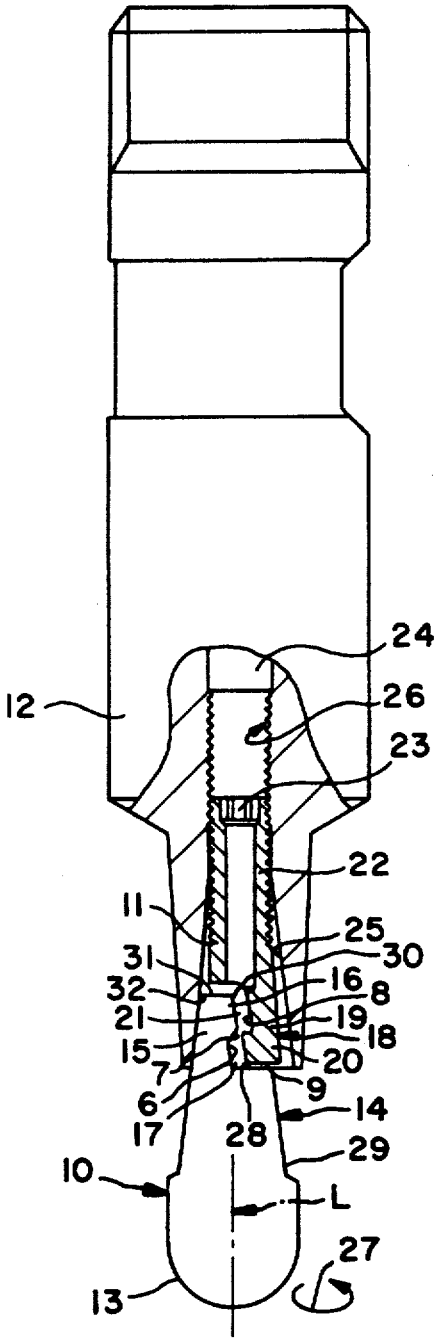
Figure 2:
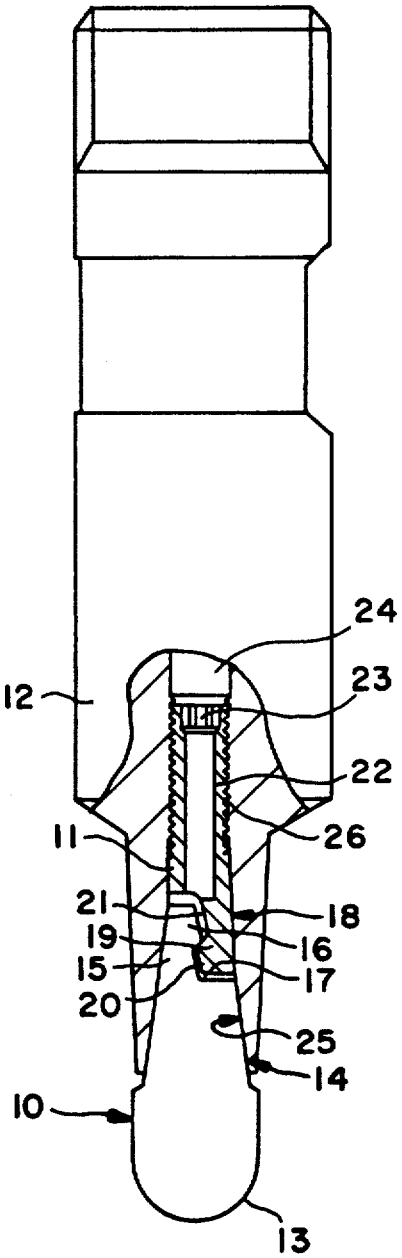

The embodiment disclosed in FIGS. 1 and 2 of a tool according to the invention comprises a cutting body 10, a locking screw 11 and a shaft 12.

The end 13 of the cutting body 10 that is directed from the shaft 12 is provided with at least one cutting edge that can be given different designs due to the field of application. Thus, the cutting edge or edges are straight and parallel to the longitudinal center axis of the cutting body when dealing with a shank end mill while the cutting edges are circular when dealing with a radial mill. The enumeration is only exemplifying and the front end of the cutting body 10 is not shown in detail in FIGS. 1 and 2 since it can be varied in many ways and does not constitute an essential part of the present invention.

At the end of the cutting body 10 that is directed towards the shaft 12 a first conical portion 14 is provided that has a first engagement means 15 comprising a first tongue 16 and a first seat or recess 17 defined by a front-to-rear extending surface 6 and a laterally extending surface 7.

Figure 3:
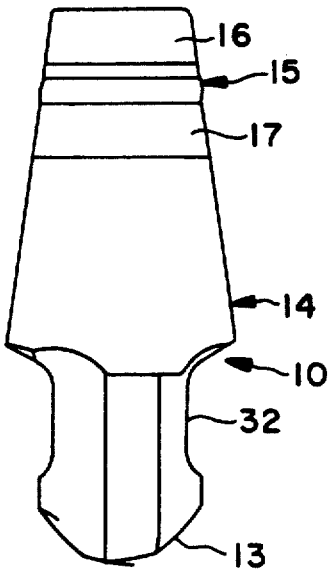

In FIG. 3 the cutting body 10 is disclosed more in detail and viewed in the plane, of the paper in FIGS. 1 and 2. From FIG. 3 it can be learned that the free end 13 of the cutting body 10 is provided with a key handle 32. The use of said key handle 32 is explained below.

The locking screw 11 has a second conical portion at the end that is directed towards the cutting body, said second conical portion having a second engagement means 19 that is intended to mate with the first engagement means 15. Each of the engagement means 15, 19 is hook-shaped, and neither hook extends around more than one-half the circumference of the respective component 10 or 11. As is obvious from FIGS. 1 and 2 the arrangement of the second engagement means 19 has caused an essential portion of the second conical portion 18 to be deleted. The second engagement means 19 comprises a second tongue 20 and a second recess 21 defined by a front-to-rear extending surface 8 and a laterally extending surface 9. In working condition the first tongue 16 cooperates with the second recess 21 and the second tongue 20 with the first recess 17.

From the foregoing it will be appreciated that the hook-shaped projection 15 is formed by the recess 17. The recess 17 includes (a) a rearwardly facing surface 28 which extends laterally inwardly from a conical outer periphery 29 of the rear portion 14, (b) the surface 6 which faces laterally outwardly and extends rearwardly from a laterally inner end of the surface 28, and (c) the surface 7 which faces the surface 28 and which extends rearwardly and laterally outwardly. A surface 30 faces laterally outwardly and extends rearwardly from a laterally outer end of the surface 7 to a rearmost end of the rear portion 14. That rearmost end is defined by a lateral surface 31 which intersects a rearmost end 32 of the outer periphery 29, the rearmost end 32 being defined by the shortest radius of the outer periphery. The laterally outer end of the surface 7 is located laterally inside of an imaginary extension of the outer periphery as is evident from viewing FIG. 1.

Inside of the second engagement means 18, in axial direction, the locking screw 11 has an externally threaded, preferably cylindrical portion 22.

An implemente such as an Allen key insert 23 is arranged at the innermost end of the locking screw 11 thus making it possible to loosen and tighten the locking screw 11 through the internal duct 24 of the shaft 12. However, normally the tightening and loosening of the locking screw 11 is carried out via the external key handle 32.

The shaft 12 is provided with a conical seat 25 at the end that is directed towards the cutting body 10. Said conical seat 25 receives the first and second conical portions 14 and 18 of the cutting body 10 and the locking screw 11, respectively. Inside of the conical seat 25 the shaft 12 has a substantially cylindrical internally threaded portion 26 that cooperates with the externally threaded portion 22 on the locking screw 11. Inside of the portion 26 the duct 24 mentioned above is located.

In FIG. 1 the starting or insertion/removal position for mounting of the cutting body 10 in the shaft 12 is disclosed. In this position the locking screw 11 is displaced axially towards the open end of the conical seat 25. Thereby it is possible that the first engagement means 15 of the cutting body 10 is inserted into the conical seat 25 and automatically takes a position for engagement with the second engagement means of the locking screw 11. When rotating the cutting body 10 in the direction of the arrow 27, preferably by a wrench that is engaging the key handle 32, the locking screw 11 will also rotate in the direction of the arrow 27. Cooperation between the external thread 22 and the internal thread 26 causes the locking screw 11 and also the cutting body 10 to be displaced axially into the shaft 12 until the conical portion 14 contacts the conical seat 25, i.e. the securement position according to FIG. 2 has been achieved wherein the first and second engagement means 15, 19 are displaced toward one another into locking relationship. The cutting body 10 is now in a satisfying way anchored in the shaft 12. Since the lateral surface 9 of the locking screw lies in the path of rotation of the lateral surface 7 of the cutting body, no rotation of the cutting body relative to the locking screw is possible.

In this connection it should be pointed out that the thread 22 of the locking screw 11 has two purposes, namely first to place the cutting body 10 in a fixed position in the shaft in the mounting state, and second, during use of the cutting tool, always to guarantee that the cutting body 10 remains in its fixed position regardless of how the dimensions of the cutting body 10 and the shaft 12 are affected by heat generated from the machining.

The threads 22 and 26 are designed as right hand threads for right hand cutting tools and as left hand threads for left hand cutting tools.

When the cutting body 10 is to be exchanged one acts in the opposite way compared to the mounting, i.e. rotation of the cutting body 10 in opposited direction to the arrow 27 is carried out until the position of FIG. 1 is achieved. At that position the cutting body 10 can be removed from the shaft 12.

Figure 4:
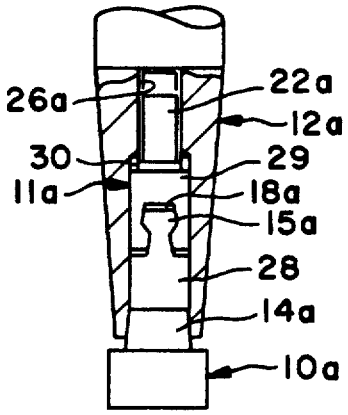

In the embodiment according to FIG. 4 the conical portion 14a emanating from the cutting body 10a has a, relatively seen, smaller axial extension, said conical portion 14a is transferred into a cylindrical portion 28 that at its free end supports a first engagement means 15a in the shape of a dove-tailed projection that is symmetrical in respect of the rotation axis of the cutting body 10a.

The locking screw 11a according to FIG. 4 is provided with a cylindrical portion 29 that is directed towards the cutting body 10a, said cylindrical portion 29 having a second engagement means 18a in the shape of a dove-tailed recess that is intended to receive the engagement means 15a in order to create cooperation between the engagement means 15a and 18a to transfer rotational movement and axial forces. The end of the locking screw 11a that is directed from the cutting body 10a has an externally threaded portion 22a. The shaft 12a is provided with a conical seat 25a to receive the conical portion 14a. Inside of the conical seat 25a the shaft has a cylindrical recess 30 that in working position receives the portion 29.

The cylindrical recess 30 is at its inner end transferred into an internally threaded recess 26a that in working position cooperates with the externally threaded portion 22a.

In principle the embodiment according to FIG. 4 functions in a corresponding way as the embodiment according to FIGS. 1 and 2.

Figure 5:
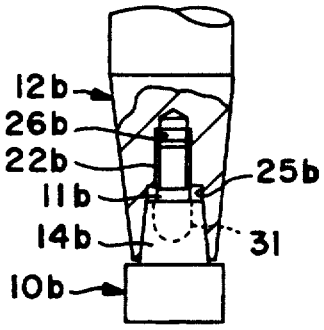

The embodiment of the invention schematically disclosed in FIG. 5 has a conical portion 14b emanating from the cutting body 10b, said conical portion 14b at its inner end having a recess 31 receiving a locking screw 11b having an externally threaded portion 22b, said locking screw 11b being fixed by brazing in said recess 31.

The shaft 12b has a conical seat 25b that in working position receives the conical portion 14b. Also the shaft 12b has an internally threaded recess 26b that in working position receives the externally threaded portion 22b.

The embodiment according to FIG. 5 differs from the embodiment described above in that the engagement means for transferring rotational movement and axial forces have been deleted. When exchanging the cutting body 10b also the locking screw 11b is exchanged.

Within the scope of the invention it is also possible to modify the embodiment according to FIG. 5 in such a way that the thread coupling between the locking screw and the cutting body is located in the recess 31 while the locking screw 11b is fixed by brazing in the shaft 26b.

Figure 6:
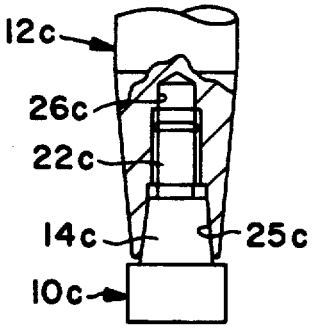

The embodiment according to FIG. 6 reminds to a great extent of the embodiment according to FIG. 5. The only principal difference is that the externally threaded portion 22c is integral with the conical portion 14c.

In all the embodiments described above the cone angle for the cutting body and the seat should be less than 25°. It is also pointed out that the embodiments described above refer to mills, i.e. tools that rotate relative its longitudinal centre axis. Mills having small cutting tips are probably the dominating application field for the present invention but also drilling and turning tools are within the scope of the invention.

The invention is in no way restricted to the embodiments described above but can be freely varied within the scope of the appending claims.

We claim:

1. A cutter adapted to be rotated about a front-to-rear extending longitudinal axis and comprising a front portion having a cutting edge and a rear portion for mounting said cutter, said rear portion having a conical outer periphery, the shortest radius of which is defined by a rearmost end of said rear portion, said rear portion including a hook-shaped projection formed by a laterally open recess in said outer periphery, said recess including a generally rearwardly facing surface extending laterally inwardly from said outer periphery, a generally laterally outwardly facing second surface extending rearwardly from a laterally inner end of said first surface, a third surface facing generally toward said first surface and extending generally laterally outwardly from a rear end of said second surface, a laterally outer end of said third surface disposed laterally inwardly of an imaginary extension of said outer periphery.

2. A cutter according to claim 1 including a fourth surface facing generally laterally outwardly and extending rearwardly from a laterally outer end of said third surface to said rearmost end of said rear portion.

3. A cutter according to claim 1, wherein said third surface extends rearwardly and laterally outwardly.

4. A cutter according to claim 1, wherein said laterally inner end of said first surface is located adjacent said axis.

5. A cutter according to claim 1, wherein said periphery defines a cone angle less than twenty-five degrees.

6. A cutter adapted to be rotated about a front-to-rear extending longitudinal axis and comprising a front portion having a cutting edge and a rear portion for mounting said cutter, said rear portion having a conical outer periphery, the shortest radius of which is defined by a rearmost end of said rear portion, said rear portion including a hook-shaped projection formed by a laterally open recess in said outer periphery, said recess including a generally rearwardly facing first surface extending laterally inwardly from said outer periphery, a generally laterally outwardly facing second surface extending rearwardly from a laterally inner end of said first surface, a third surface facing generally toward said first surface and extending generally laterally outwardly from a rear end of said second surface, said recess extending circumferentially for no more than one-half the circumference of said outer periphery.

7. A cutter adapted to be rotated about a front-to-rear extending longitudinal axis and comprising a front portion having a cutting edge and a rear portion for mounting said cutter, said rear portion having a conical outer periphery, the shortest radius of which is defined by a rearmost end of said rear portion, said rear portion including a hood-shaped projection formed by a laterally open recess in said outer periphery, said recess including a generally rearwardly facing first surface extending laterally inwardly from said outer periphery, a generally laterally outwardly facing second surface extending rearwardly from a laterally inner end of said first surface, a third surface facing generally toward said first surface and extending generally laterally outwardly from a rear end of said second surface, a laterally inner end of said first surface being located adjacent said axis, said third surface extending rearwardly and laterally outwardly, a laterally outer end of said third surface disposed laterally inwardly of an imaginary extension of said outer periphery, said outer periphery defining a cone angle less than twenty-five degrees, said recess extending circumferentially for no more than one-half the circumference of said outer periphery.

*8. A cutter adapted to be rotated about a front-to-rear extending longitudinal axis and comprising a front portion having a cutting edge and a rear portion for mounting said cutter, said rear portion having a conical outer periphery, the shortest radius of which is defined by a rearmost end of said rear portion, said rear portion including a hook-shaped projection formed by a laterally open recess in said outer periphery, said recess including a generally rearwardly facing first surface extending laterally inwardly from said outer periphery, and an additional surface facing generally toward said first surface, said additional surface including laterally inner and outer ends and extending generally laterally outwardly and rearwardly from said laterally inner end to said laterally outer end, said laterally outer end of said additional surface being disposed laterally inwardly of an imaginary extension of said outer periphery.*

*9. A cutter adapted to be rotated about a front-to-rear longitudinal axis and comprising a front portion having a cutting edge and a rear portion for mounting said cutter, said rear portion having a conical outer periphery, the shortest radius of which is defined by a rearmost end of said rear portion, said rear portion including a hook-shaped projection formed by a laterally open recess in said outer periphery, said recess including a generally rearwardly facing first surface extending laterally inwardly from said outer periphery, and an additional surface facing generally toward said first surface, said additional surface including laterally inner and outer ends and extending generally laterally outwardly and rearwardly from said laterally inner end to said laterally outer end, said recess extending circumferentially for no more than one-half the circumference of said outer periphery.*

*10. A cutter adapted to be rotated about a front-to-rear longitudinal axis and comprising a front portion having a cutting edge and a rear portion for mounting said cutter, said rear portion having a conical outer periphery, the shortest radius of which is defined by a rearmost end of said rear portion, said rear portion including a hook-shaped projection formed by a laterally open recess in said outer periphery, said recess including a generally rearwardly facing first surface extending laterally inwardly from said outer periphery, and an additional surface facing generally toward said first surface, said additional surface including laterally inner and outer ends and extending generally laterally outwardly and rearwardly from said laterally inner end to said laterally outer end, said recess extending circumferentially for no more than one-half the circumference of said outer periphery, a laterally inner end of said first surface is located adjacent said axis, said laterally outer end of said additional surface being disposed laterally inwardly of an imaginary extension of said outer periphery, said outer periphery defining a cone angle less than twenty-five degrees.*

* * * * *